Sept. 27, 1932.   W. H. KNISKERN   1,879,322
VALVE
Filed Nov. 25, 1930
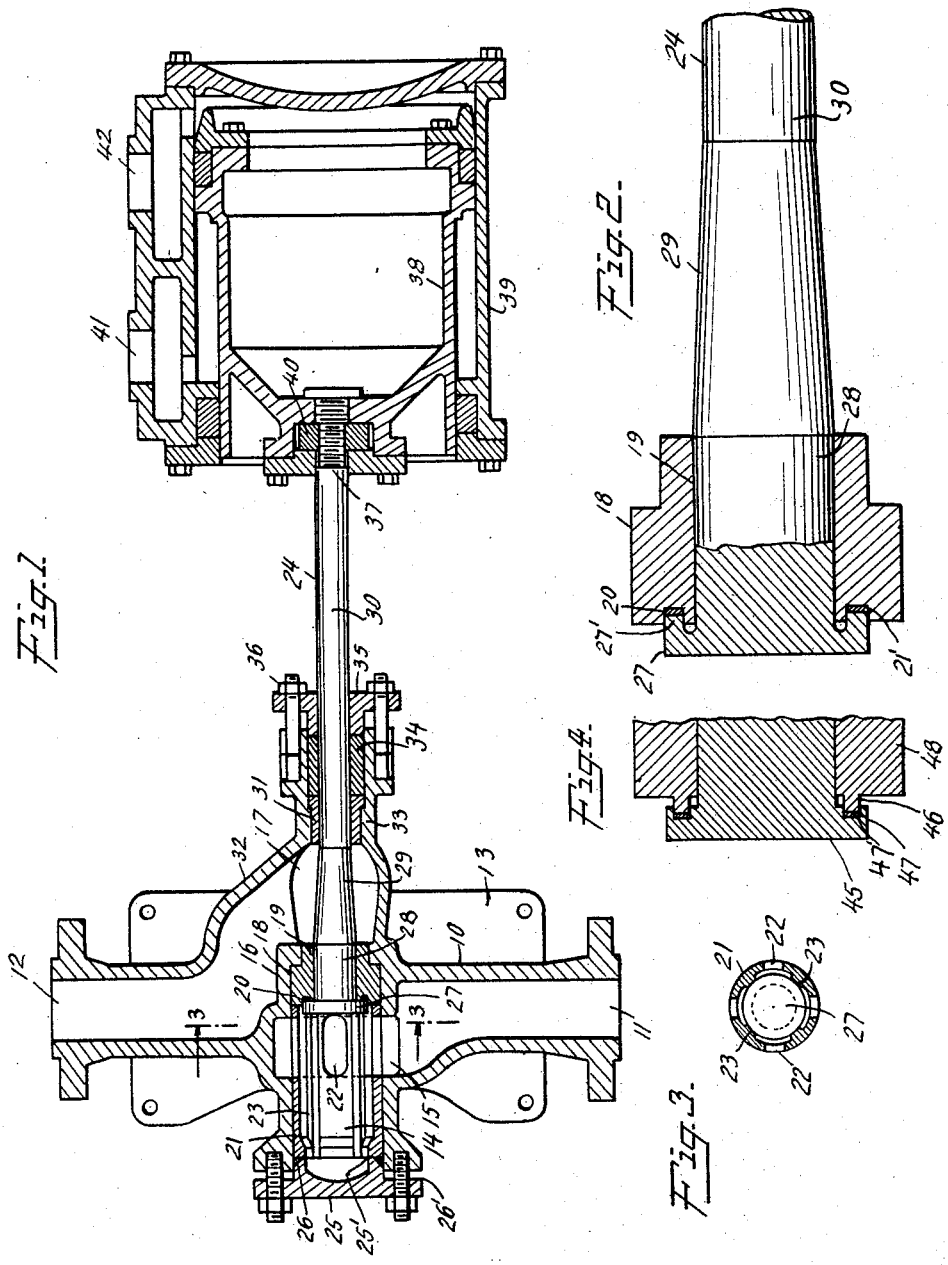
INVENTOR
Walter H. Kniskern
BY
ATTORNEY Patented Sept. 27, 1932

1,879,322

UNITED STATES PATENT OFFICE

WALTER H. KNISKERN, OF PRINCE GEORGE COUNTY, VIRGINIA, ASSIGNOR TO ATMOSPHERIC NITROGEN CORPORATION, OF NEW YORK, N. Y., A CORPORATION OF NEW YORK

VALVE

Application filed November 25, 1930. Serial No. 498,069.

This invention relates to valves and more particularly to valve devices applicable to control the escape of fluids under conditions involving a large pressure drop between the inlet and outlet ports of the valve and is in the nature of an improvement on the valve described and claimed in my copending application, Serial No. 484,259, filed September 25, 1930.

One object of this invention is to provide a valve of simple and rugged design to control the flow of fluids, liquid or gas, under pressure, which valve is so designed as to separate the functions of tightly sealing the valve when closed and wire drawing during operation. That is to say, in accordance with this invention, a portion of the valve stem other than the sealing portion, is designed to be subjected to the wire drawing effects occasioned by the flow of fluid from the inlet to the outlet side of the valve, thus leaving the sealing portion of the valve intact in order to effect tight closing when desired. The invention herein is particularly directed to the construction of the sealing portion of the valve stem and seat.

A further object is to provide a valve stem and seat so designed as to maintain an efficient seal when in closed relation.

Other objects and advantages will appear from the following detailed description.

In the accompanying drawing forming a part of this specification and showing for purposes of exemplification, a preferred form of this invention without limiting the claimed invention to such illustrative instance:

Fig. 1 is a vertical section partly in elevation through a valve and servo-motor for operating the valve embodying the improvement of the present invention;

Fig. 2 is a fragmentary detailed section of the valve stem and seat;

Fig. 3 is a section through the valve stem and bearing support therefor taken in a plane indicated by the line 3—3 of Fig. 1, and Fig. 4 is a fragmentary detailed section of a modified form of the valve stem and seat.

In the preferred embodiment illustrated on the drawing, the invention is shown incorporated in a valve, the stem of which is adapted to be moved by a servo-motor and the present description will be confined to the present illustrated embodiment of the invention. It will be noted, however, that the novel features and improvements are susceptible to other applications, such, for example, as manually operated valves or valve devices generally, particularly valves for controlling escape of fluids involving a large pressure drop from the inlet to the outlet side thereof. Hence, the scope of this invention is not confined to the embodiment herein disclosed.

In the drawing, 10 indicates the valve housing preferably cast integral to provide an inlet port 11 and a discharge port 12. The housing may be supported on or cast integral with the supporting casting 13. Inlet port 11 communicates with high pressure inlet chamber 14 preferably of cylindrical shape and formed with an enlarged chamber portion 15.

A wall 16 preferably integral with the valve housing separates the inlet chamber 14 from the outlet chamber 17 communicating with the outlet port 12. This wall is formed with an opening providing a housing support for the valve seat 18, which snugly rests within the opening in wall 16 as shown in Fig. 1. Preferably, the seat 18 is provided with a cylindrical seating portion 19 and an annular groove 20 disposed in the end wall of the seat. A layer of relatively soft metal 21' such as silver or the like is preferably inserted in the base of the annular groove 20. This packing layer performs an important function in the sealing of the valve as more fully pointed out hereafter.

Distance piece 21, provided with radially disposed openings 22 and also radially disposed ribs 23 which constitute a bearing support for the flange 27 of stem 24, is mounted within the housing 14. One end of this bearing member abuts against the seat 18 and maintains it in fixed position. The other end of the distance piece 21, as well as the end of chamber 14, is closed off by cover plate 25 bolted or otherwise secured to the walls defining chamber 14. A conical seat for a rubber gasket 26 is formed between the flange 25' on cover plate 25 and the walls of chamber 14, and a clearance space 26' is disposed between the end of the walls of chamber 14 and the cover plate. This construction permits simultaneous sealing of the cover plate and pressure upon distance piece 21.

The valve stem 24 preferably comprises a sealing portion 27 preferably T-shaped in cross-section as shown in Fig. 2 thus providing an annular flange 27' adapted to fit closely into annular groove 20. A cylindrical portion 28 of an extent approximately equal to the extent of cylindrical seating portion 19, a truncated conical portion 29 which, when moved through the cylindrical portion 19, permits flow of fluid therethrough, and the stem proper 30 which is of smaller diameter than the cylindrical portion 28, are all disposed in longitudinal alignment with sealing portion 27. Sealing portion 27 is adapted to register with the groove 20 of the seat 18 and presses against the relatively soft layer 21' thus forming a fluid-tight seal. The diameter of seating portion 28 is substantially the same as that of seating portion 19, there being only a few thousandths of an inch clearance between the two. The base of conical portion 29 is of the same diameter as portion 28 and the opposite end of this portion is of reduced diameter and preferably of the same diameter as the stem portion 30.

Stem 24, it will be noted, extends through opening 31 in wall 32 defining one wall of the low pressure chamber 17. Opening 31 is provided with a throat bushing 33 for stem 24, usual packing 34 and a packing retaining member 35 which may be bolted as indicated at 36 or otherwise secured to the wall 32 to retain the packing and maintain a fluid-tight joint about the stem. Since stem 24 extends through wall 32 of the low pressure chamber 17, it has to be packed only against the low pressure in this chamber and not against the high pressure occurring in chamber 14 of the valve.

The end of valve stem 24 extending through the wall 32 is threaded at 37 and is secured to the stepped piston 38 in the operating cylinder on servo-motor 39 by nut connection 40 or by any other suitable means. Pressure fluid from a suitable source may be introduced and discharged into and from servo-motor 39 through ports 41 and 42 and thereby move the piston 38 to the left (Fig. 1) and back, thus moving the piston to open and close the valve.

In operation with the valve stem in seated position as shown in Fig. 1, admission of pressure fluid to the servo-motor 39 causes valve stem 24 to move towards the left, removing the concentric T-shaped ledge or flange 27 from the circular groove 20. Since the cylindrical seating portion 28 remains within the seating portion 19, no substantial flow through the valve takes place. Continued movement of the valve stem causes cylindrical portion 28 to completely leave the seating portion 19 and conical portion 29 to enter this seating portion providing a substantial space through which fluid flows from the high pressure chamber 14 to the low pressure chamber 17. Further movement towards the left, due to the conical shape of portion 29, increases the extent of this space and consequently increases the rate of flow through the valve. Conversely, movement towards the right from a partially open position decreases the rate of flow through the valve.

It will be noted that initial movement of stem 24 from closed position does not initiate flow through the valve. Hence, the sealing ledge or flange 27 is not subjected to wire drawing caused by the rush of fluid from the high pressure chamber 14 into the empty low pressure chamber 17. This leaves the ledge or flange 27 intact to effect tight closing of the valve when desired and increases the effective life of the valve. Wear of the face of ledge 27 will not affect the seal since the layer of relatively soft material 21' will completely fill the space between the end of ledge 27 and the base of the groove 20', forming a fluid tight seal for the valve. It is apparent that the life of the stem and seat will be materially lengthened thus resulting in increased economy of operation.

It will also be noted that substantial flow through valve seat 18 takes place only when cylindrical portion 28 leaves seating portion 19. Wire drawing of the end of portion 28 remote from the ledge 27 is obviously of no moment since this end of portion 28 is not intended to have a sealing or closing function. Further, when the valve is closed, the pressure within the chamber 14 aids in maintaining the valve stem in sealing and seated position.

It is obvious that the relative positions of the sealing flange and the groove may be reversed as shown in Fig. 4 wherein the sealing portion 45 of the valve stem contains a groove 47 in the bottom of which is placed a layer 47' of relatively soft packing material. The seat 48 is provided with a projecting flange 46 adapted to register with the groove 47 to effect the seal. The valve is operated in precisely the same manner as heretofore described in connection with the form of seal illustrated in Fig. 2.

The invention as hereinabove described is embodied in a particular form of construction, but it may be variously embodied within the scope of the following claims.

I claim:

1. A valve housing comprising a fluid inlet chamber and a fluid outlet chamber, a valve stem having a sealing portion, a seat in said housing for said stem, said seat comprising a seating portion passing therethrough and connecting the fluid inlet chamber with the fluid outlet chamber and a sealing portion on the end face thereof disposed in the fluid inlet chamber, one of said sealing portions being provided with a groove and the other of said sealing portions being formed as a flange to register with said groove, said valve stem having a seating portion arranged to fit within the seating portion of said seat, a portion of reduced diameter arranged to be moved through said seat to permit flow therethrough, the fluid pressure in the inlet chamber of said valve acting to maintain the sealing portion of said valve stem in sealing position, the initial movement of the valve stem away from said seat against the pressure in the fluid inlet chamber resulting in movement of the sealing portion away from said seat, the seating portion remaining within said seat, thereby preventing flow therethrough and wire drawing of the sealing portion of the valve stem, continued movement of the stem resulting in the seating portion leaving the seat, thereby permitting flow through said seat.

2. A valve housing comprising a fluid inlet chamber and a fluid outlet chamber, a valve stem having an annular flange on one end thereof, a seat in said housing for said stem, said seat comprising a seating portion passing therethrough connecting the fluid inlet chamber with the fluid outlet chamber and an annular groove in the end face thereof disposed in the fluid inlet chamber, said annular flange being arranged to register with said groove, said valve stem having a seating portion contiguous to said flange arranged to fit within the seating portion of said seat and a portion of reduced diameter arranged to be moved through said seat to permit flow therethrough, the fluid pressure in the inlet chamber of said valve housing acting to maintain the valve stem in sealing position, initial movement of the stem away from said seat against the pressure in the fluid inlet chamber resulting in movement of the flange away from said groove, the seating portion remaining within said seat, thereby preventing flow therethrough and wire drawing of the flange of the valve stem, continued movement of the stem resulting in the seating portion leaving the seat, thereby permitting flow through said seat.

3. A valve comprising a valve housing, a valve stem, a seat in said housing for said stem, said seat having a sealing portion, said stem comprising a sealing portion, a large diameter and a small diameter portion connected by a tapered portion, the large diameter portion of the stem fitting snugly within said seat, one of said sealing portions being provided with a groove, and the other of said sealing portions being provided with a flange to register with said groove.

4. In a valve, a fluid inlet and a fluid outlet, a valve seat provided with a cylindrical opening connecting the inlet with the outlet, said seat having a groove in one end wall thereof, a valve stem comprising a concentric ledge adapted to register with said groove, a large diameter and a small diameter portion connected by a tapered portion, the large diameter portion of the stem fitting snugly within said cylindrical opening of the seat, and packing material in said groove.

5. A valve comprising a valve housing, a valve stem, a seat in said housing for said stem, said seat having an annular groove, said stem comprising a concentric ledge adapted to register with said groove, a large diameter and a small diameter portion connected by a tapered portion, the large diameter portion of the stem fitting snugly within said seat.

6. A valve for controlling escape of fluid under pressure permitting a pressure drop in the fluid at the outlet side of the valve, comprising a housing consisting of a fluid inlet chamber and a fluid outlet chamber, a valve stem movable in said housing, having one end extending exteriorly to the housing through the wall of the outlet chamber, thus necessitating packing of said stem at the points which extend through the housing against the low pressure existing in the outlet chamber, a seat for said stem, said seat comprising a cylindrical portion connecting the inlet and the outlet chambers, said seat having an annular groove in one wall thereof, a layer of soft metal in said groove, said valve stem comprising a concentric ledge adapted to register with said annular groove, said ledge being constructed and arranged so that the pressure within the inlet chamber acts on the ledge to maintain it in sealed position, said stem also comprising a cylindrical seating portion in line with said concentric ledge and extending within said cylindrical portion of said seat and a truncated conical portion adapted to be moved into the cylindrical seating portion of said seat to permit flow therethrough.

7. A valve comprising a valve housing consisting of a fluid inlet chamber and a fluid outlet chamber, a valve stem movable in said housing and having one end extended exteriorly thereof, a seat for said stem connecting the inlet and outlet chambers and cooperating with the valve stem to control the flow through said valve housing, said seat comprising a cylindrical seating portion and having an annular groove in an end wall thereof, said valve stem being provided with an annular ledge adapted to fit within said annular groove, a cylindrical portion contiguous to said annular ledge arranged to fit within the cylindrical seating portion of said seat, and a truncated conical portion in alignment with and contiguous to said cylindrical portion adapted to be moved into said cylindrical portion of said seat to permit flow therethrough, initial movement of the truncated conical portion into said seat causing removal of said annular ledge away from said annular groove.

8. A valve comprising a valve housing consisting of a fluid inlet chamber and a fluid outlet chamber, a valve stem movable in said housing and having one end extended exteriorly thereof, a seat for said stem connecting the inlet and outlet chambers and cooperating with the valve stem to control the flow through said valve housing, said seat comprising a cylindrical seating portion having an annular projecting flange on an end wall thereof, said valve stem being formed with an enlarged end having an annular groove therein adapted to register with said annular projecting flange, a cylindrical portion contiguous to said enlarged end arranged to fit within the cylindrical seating portion of said seat, and a truncated conical portion in alignment with and contiguous to said cylindrical portion adapted to be moved into said cylindrical portion of said seat to permit flow therethrough, initial movement of the truncated conical portion into said seat causing removal of said annular groove away from said annular projecting flange.

WALTER H. KNISKERN.